Patented Nov. 5, 1929

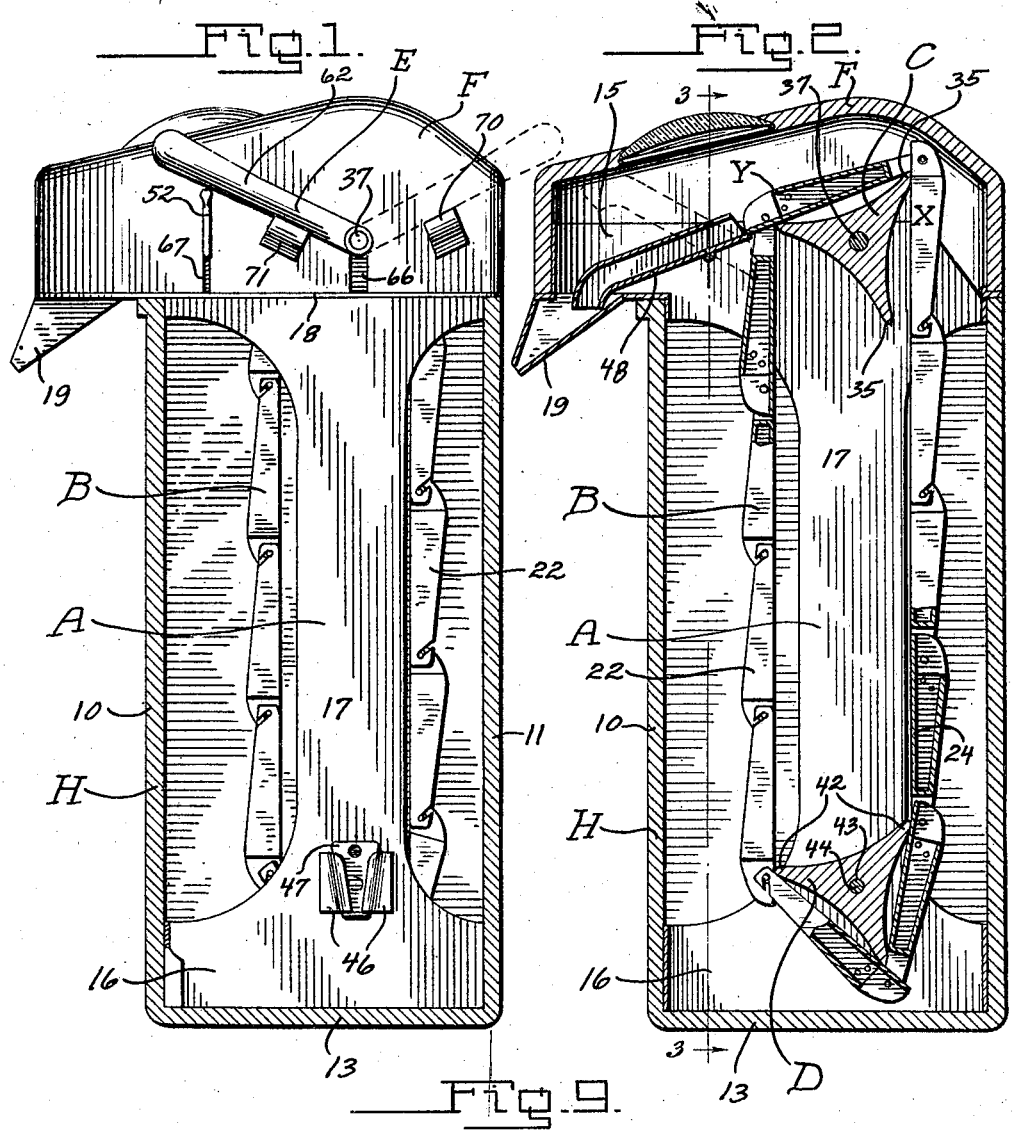
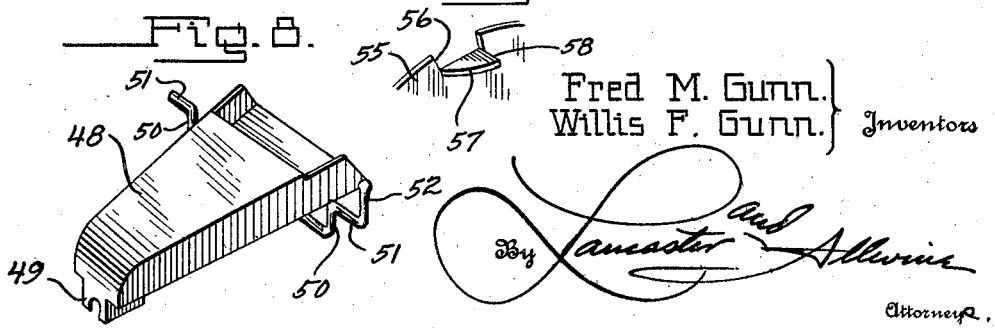

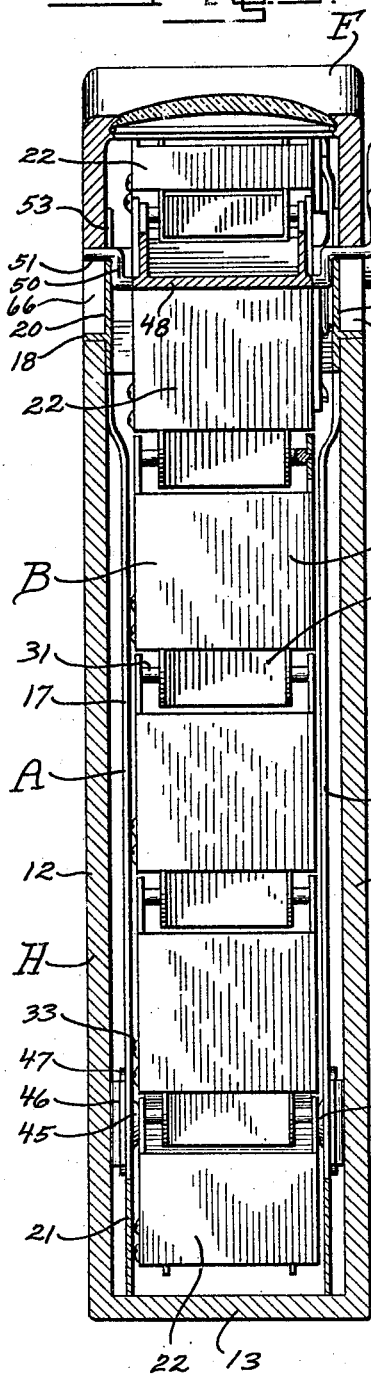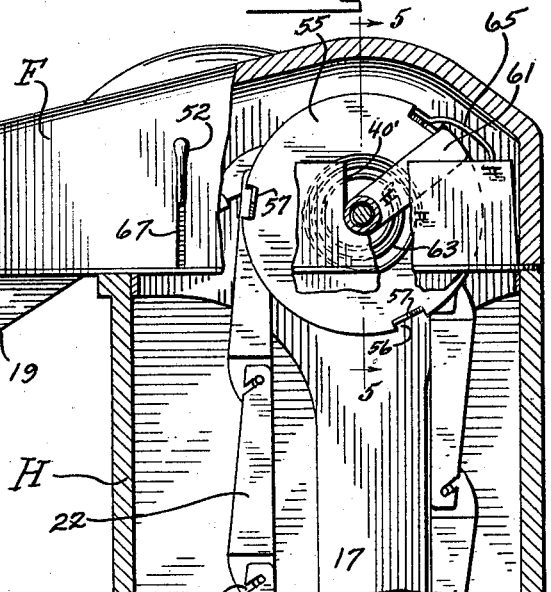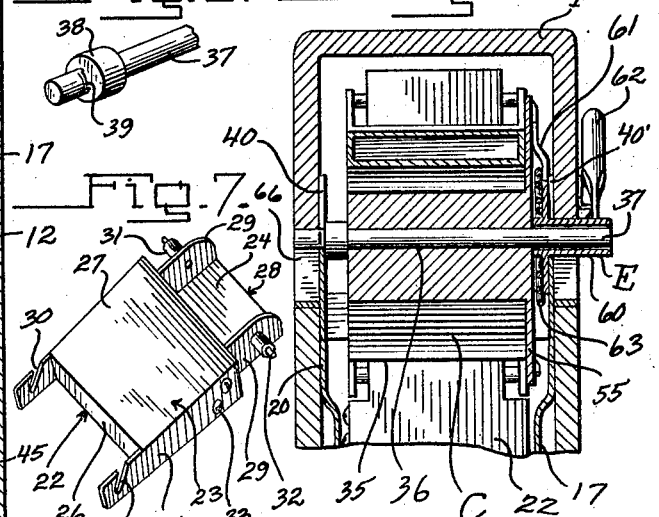

1,734,671

UNITED STATES PATENT OFFICE

FRED M. GUNN, OF EL PASO, AND WILLIS F. GUNN, OF FORT WORTH, TEXAS

MEASURING CONVEYER

Application filed December 17, 1926. Serial No. 155,506.

The present invention relates to conveyers, and the primary object of the invention is to provide an improved measuring conveyer which is susceptible of application to a number of various uses such as for the measuring, conveying and dispensing of either liquids or granular materials.

A further object of the invention is to provide an improved measuring conveyer primarily intended for use in the measuring and dispensing of equal and uniform quantities of liquids such as syrups and the like used for the making of soft drinks.

A further object of the invention resides in the provision of a device as set forth embodying a plurality of measuring vessels so connected as to form an endless carrier for conveying of the liquid to a point of discharge, and which vessels embody means whereby the capacity thereof may be varied in order that different quantities of liquid may be dispensed with the device.

A further object of the invention resides in the provision of a measuring conveyer embodying an endless carrier composed of a plurality of pivotally connected measuring vessels, with operating means for the carrier whereby the measuring vessels are successively brought into a discharging position for delivering of the contents thereof into a suitable receptacle or container positioned for receiving the contents of the measuring vessel.

A still further object of the invention resides in the provision of a measuring conveyer for syrups or the like embodying a plurality of measuring vessels so constructed as to permit of the vessels being pivotally linked together in an endless carrier.

A still further object of the invention resides in the provision of a measuring conveyer for syrups or the like which is of such construction as to eliminate the necessity of bolts, screws, or other fastening elements for retaining any of the parts in assembled relation, and thus permitting of the device being readily disassembled for the purpose of thorough cleaning of the device.

Other objects and advantages of the invention will be apparent during the course of the following detailed description, taken in connection with the accompanying drawings forming a part of this specification and in which drawings:

Figure 1 is a side elevation of the improved measuring conveyer and showing the same in position within a container for the dispensing of measured quantities of material from the container.

Figure 2 is a central vertical section through the conveyer and showing one of the measuring vessels in its discharging position.

Figure 3 is an enlarged vertical section on line 3—3 of Figure 2.

Figure 4 is a fragmentary sectional view through the upper portion of the conveyer and illustrating certain features of construction of the operating means for the endless carrier.

Figure 5 is a fragmentary section on line 5—5 of Figure 4.

Figure 6 is a fragmentary perspective view of one end of the mounting shaft for the upper end of the endless carrier.

Figure 7 is a perspective view looking at the bottom side of one of the measuring vessels or buckets.

Figure 8 is a perspective view of the trip pan or chute for transferring of the material from the endless carrier to a suitable discharge opening.

Figure 9 is a fragmentary perspective view of a portion of the ratchet disc of the operating means.

Referring to the drawings in detail, and wherein similar reference characters designate corresponding parts throughout the several views, the letter A designates a supporting frame, B an endless carrier mounted in the frame A upon feed and idler pulleys C and D respectively, E operating means for imparting of an intermittent movement to the endless carrier B, and F the retainer cap or cover serving as a closure for the upper end of the conveyer. The letter H may designate a suitable container or storage receptacle for holding of a liquid to be dispensed in predetermined quantities by means of the improved measuring conveyer.

The container H may be of any preferred construction and intended for holding any kind of liquid, and in the example shown is in the form of a well having front and rear walls 10 and 11 respectively, side walls 12, and a bottom wall 13. Referring now to the specific construction of the supporting frame A, and which is preferably formed of sheet metal, the same embodies a head portion 15 and base portion 16 connected at opposite sides by means of vertical web portions 17. The head 15 is provided adjacent its lower edge, at its rear and side edges with a horizontally projecting flange 18, and the forward end of the head projects past the front wall of the container H and is provided with a forwardly and downwardly inclined spout 19 through which the liquid being dispensed may pass into a suitable receptacle. As will be observed, the head 15 and base 16 are of open construction, and when positioned in the container H, the flanges 18 engage upon the upper edge of the walls of the container while the base portion 16 rests upon the bottom wall 13 of the container and engages the front and rear walls of the container in a manner for retaining the conveyer against lateral shifting when positioned in the container. As will be observed in Figure 3, the vertical web portions 17 connect the side walls 20 and 21 of the head and base portions 15 and 16 respectively.

The endless carrier B and which is intended to be mounted in the supporting frame A, embodies a plurality of pivotally connected measuring buckets or vessels 22 each of which is of identical construction, and the carrier is composed of an odd number of these measuring buckets or vessels 22. The buckets 22, which are of substantially flat formation, each embodies a cup portion 23 formed by a flat inner wall 24, parallel guide walls 25, a bottom wall 26, and an outer wall 27 which preferably extends outwardly at an incline from the bottom wall 26 toward the open or discharge end of the bucket. Projecting forwardly from the open or discharge end of the cup, is a discharge trough 28 provided with side walls 29 arranged inwardly of the side walls 25 of the cup portion 23. The side walls 25 of the buckets project rearwardly past the bottom wall 26 and are each provided with forwardly inclined slots 30 which open at the outer side of the bucket as clearly illustrated in Figures 2 and 7. Carried by each side wall 29 of the trough 28, and projecting outwardly therefrom in axial alignment, are pinions 31 provided at their outer ends with reduced bearing portions 32 which are intended to pivotally engage in the inclined slots 30 of each preceding bucket when the buckets are connected for forming the endless carrier B. Thus it will be seen that the pinions 31 and inclined slots 30 provide means whereby a plurality of the buckets may be pivotally connected together for forming the endless carrier B.

Each of the buckets 22 is provided with means whereby the capacity thereof may be varied so that different quantities of liquid may be dispensed by the buckets, and this means preferably consists in providing a number of suitably arranged openings in one of the side walls 25 of the cup portion 23 and closing said openings by means of threaded plugs or screws 33. When desiring to reduce the amount of liquid to be dispensed by each bucket, it is merely necessary to remove the desired one of the regulating screws 33 from each bucket, so that when the buckets are moving upwardly at the rear of the conveyer the liquid will be allowed to drain through the opening until the level of the liquid in the bucket is even with the lower edge of the opening from which the screw has been removed. These regulating screws 33 are provided for use when it is desired that an amount of the liquid less than that of the full capacity of each bucket be dispensed through the spout 19.

Referring now to the feed pulley C, which is mounted at the upper end of the supporting frame A, the same is preferably of cast metal and of triangular shape in cross section for providing three horizontally disposed gripping edges or points 35. The side faces of the triangular shaped pulley are preferably concaved as shown in Figure 2, and the pulley is provided with a centrally disposed bore 36 which extends parallel with the gripping edges 35. This feed pulley C is intended to be loosely mounted upon a horizontally disposed shaft 37 having one end thereof mounted in one of the side walls 20 of the frame head 15.

The shaft 37, at one end of the pulley C, is provided with a spacing collar 38, and outwardly of the collar the shaft is provided at diametrically opposite points with transverse recesses 39 which are intended to interfit with the side edges of an upwardly opening bearing slot 40 provided in one of the side walls 20 as illustrated in Figure 5. The shaft 37 is intended to be slid downwardly through the bearing slot 40, in which position it will be seen that a portion of the shaft projects past the head side wall 20.

The idler pulley D, which is of like construction as that of the feed pulley C, is provided with the three gripping edges or points 42 and with a bore 43 which extends parallel with the gripping edges 42. This idler pulley D, which is intended to be rotatably mounted directly below the feed pulley C, is rotatably mounted upon a lower shaft 44 having its ends mounted in suitable bearings 45 arranged at the inner side of the side walls 21 of the frame base portion 16. Thus, each of the pulleys C and D are mounted for free rotation upon their respective mounting shafts, with the idler pulley D mounted in spaced relation below the feed pulley C and with the gripping edges or points 42 of the pulley D extending parallel with the gripping edges or points 35 of the feed pulley C.

A novel retaining means is provided for removably retaining the shaft 44 in proper position within the bearings 45, which means embodies a set of clips 46 suitably secured to the outer faces of the side walls of the frame A for providing pockets for receiving wedge shaped thrust plates 47 which when positioned in the pockets formed by the clips 46 will prevent lateral shifting of the shaft 44.

It is believed to be readily apparent the manner in which the shaft 44 may be withdrawn from the pulley D upon removing of the thrust plates 47 arranged at each end of the shaft.

Pivotally mounted between the side plates 20 of the frame head 15, and forwardly of the feed pulley C, is a suitable trip pan or chute 48 which preferably converges toward its forward end and terminates in a depending nozzle 49 adapted to align with the spout 19 when the trip pan is in its normal position. This trip pan 48 is pivotally mounted adjacent its rear end by means of a suitable pivot member secured to the lower side of the pan and projecting to each side of the pan with the projecting portions of the member bent upwardly for forming thrust arms 50 provided at their upper ends with horizontally extending axially aligning bearing portions 51. The outer end of one of the bearing portions 51 is provided with a suitable handle 52 for manual manipulation of the pan or chute 48. As will be observed in Figure 8, the cover plate of the trip pan terminates short of the rear end of the pan for allowing the measuring buckets to pass the upper side of the pan and engage the bottom side thereof as illustrated in Figure 2. The pivot member for the trip pan or chute 48 has the bearing portions 51 thereof resting in suitable bearing grooves 53 provided in horizontal alignment in the side plates 20 and opening at the upper edges thereof as illustrated in Figure 3. By observing Figure 3 it will be seen that when the chute 48 is in position, that the thrust arms 50 thereof will engage the confronting faces of the side plates 20 in a manner for preventing lateral shifting of the chute. This chute 48 is mounted in a manner so that the forward portion of the chute will overbalance that portion of the chute disposed rearwardly of its pivotal mounting, and thus cause the chute to normally return to a forwardly and downwardly inclined position as illustrated in Figure 2.

Referring now to the operating means E for successively bringing the measuring vessels 22 into a discharging position, the same embodies a ratchet plate or disc 55 which is rigidly carried by one end of the feed pulley C, which disc in the example shown has been illustrated as comprising an integral portion of the feed pulley. This disc 55 may of course be formed of sheet metal if so desired and secured to one end of the pulley C in any preferred and suitable manner. The peripheral face of the disc 55 is provided with notches 56, and in the example shown, three in number, and projecting outwardly from the base of each notch 56, is a cam like stop 57 provided at its rear end with an abrupt shoulder 58. Thus it will be seen that one of the notches 56 and companion projections 57 is provided for each of the gripping edges 35 of the pulley C. If the disc 55 be formed of metal which may be readily bent, the projections 57 may be formed from that portion of the material struck to provide the peripheral notches 56. Loosely mounted upon the shaft 37 at the opposite end from that at which the collar 38 is provided, and serving as a thrust bearing for one end of the pulley C, is a tubular hub 60 which is rotatably mounted in the lower end of a bearing slot 40' provided in one of the head side plates 20 in alignment with the opposite bearing slot 40. Rigidly carried by the hub 60 inwardly of the frame head 15, and extending radially therefrom, is a grip arm or plate 61 which is intended to bear against the outer face of the ratchet disc 55 for gripping engagement with the cam like projections 57. This arm 61 is preferably of a yieldable nature for permitting of the free end thereof to readily move to a position behind the projections 57 into engagement with the shoulders 58 so that upon forward movement of the arm, the disc 55 will be rotated forwardly. An operating handle 62 is carried by the hub 60 outwardly of the cover F, and preferably extends from the hub in a like direction as that of the grip arm 61. Arranged between the grip arm 61 and disc 55, is a spirally formed spring 63 having one end secured to the arm 61 and its opposite end secured to one of the side plates 20 in a manner whereby the arm 61 is normally returned to a position as illustrated in Figure 4 after being swung forwardly by means of the operating handle 62.

A means is provided for preventing counter rotation of the disc 55, and this means consists of a spring finger 65 having one end anchored to the head 15 and extending forwardly therefrom with its free end bearing against the circumferential face of the disc in a manner whereby upon each complete movement of the disc by means of the arm 61, the forward end of the spring will engage in one of the notches 56 and bear against the forward edge thereof for preventing the disc from being moved in a counter direction either by means of the return of the arm 61 or due to the weight of the liquid in the buckets being elevated at the rear of the conveyer.

The cap or cover F may be of any suitable formation and is of a shape at its lower edge so that when positioned over the conveyer will engage upon the marginal flange 18 in a manner for forming an efficient closure for the upper end of the container H. The side walls of the cover F are provided with transversely aligning slots 66 which open at the lower edge of the cover and which are adapted to align with the bearing slots 40 and 40' of the frame head 15. The side walls of the cover F are also provided with transversely aligning downwardly opening grooves 67 which when the cover is in position align with the bearing grooves 53 of the frame head 15. When the cover F is in position upon the flange 18, the slots 66 and co-acting bearing slots 40 and 40' provide bearings for opposite ends of the mounting for the feed pulley C, while the grooves 67 and co-acting bearing grooves 53 provide bearings for the pivoted trip pan 48 and also permit ready removal of the trip pan upon raising of the cap.

Mounted upon one of the side walls of the cap F and to that side at which the handle 62 is disposed, are suitable stops 70 and 71 which are arranged at substantially one hundred and twenty degrees apart, which stops serve for limiting swinging movement of the handle 62. In Figure 1, the handle 62 is shown swung forwardly into engagement with the stop 71 in which position one of the measuring buckets is disposed in a discharging position as illustrated in Figure 2. When the handle 62 swings rearwardly into engagement with the stop 70, the trip arm 61 moves to a position behind one of the cam projections 57 in a manner as illustrated in Figure 4. Thus it will be seen that upon each forward swinging of the handle 62, one of the measuring buckets 22 will be moved into a discharging position above the feed pulley C.

In operation, with the handle 62 in its normal position against the rear stop 70 as illustrated in dotted lines in Figure 1, the operator upon grasping the handle 62 and swinging the same forwardly into engagement with the stop 71, revolves the feed pulley C forwardly about its mounting shaft 37 for one-third of a revolution, which rotating of the pulley C will move the measuring bucket X in Figure 2 into a discharging position as indicated by the bucket marked Y in Figure 2. This rotating movement of the pulley C is caused by the engagement of the grip arm 61 behind one of the cam projections 57 of the ratchet disc which is rigidly carried by the pulley. When the handle 62 has been swung forwardly to its fullest extent, the free end of the spring finger 65 engages in one of the notches 56 of the disc 55 and bears against the leading edge thereof in a manner whereby upon releasing of the handle 62 the disc 55 and pulley C will be held against counter rotation while the handle is being returned to its normal position by means of the spring 63. When the bucket Y is in its discharging position its discharge trough 28 opens into the chute 48 in a manner whereby the contents from the bucket will be directed through the inclined chute to the spout 19. Upon further advancing movement of the bucket Y, the trip chute 48 is swung upwardly as shown by dotted lines in Figure 2 for allowing the bucket to readily pass the chute, and immediately after which the forward heavy end of the chute will again swing downwardly to its normal position above the spout 19.

Referring now to the novel assembling features of the device, which permits of the device being assembled without the requiring of screws, bolts, or other similar types of fastening elements, it will readily be apparent the manner in which the buckets 22 may be pivotally connected for providing the endless carrier B by means of the pinions 31 and inclined slots 30. The mounting for the feed pulley C may then be lowered into the upwardly opening bearing slots 40 and 40', after which the shaft 44 may be inserted through the side of the frame A and through the idler pulley D for rotatably mounting the pulley D in spaced relation below the drive pulley C. The thrust plates 47 may then be positioned in the clips 46 for preventing longitudinal movement of the shaft 44. The pivoted trip pan or chute 48 may readily be lowered into position through the bearing grooves 53, and it will be seen that upon positioning of the cap F, the mountings for the pulley C and chute 48 will be held in proper position. This construction also permits of the device being readily disassembled for thorough cleaning when such becomes desirable.

When desiring to fill the container H, the cap F may first be removed and then the chute 48 lifted out of position for allowing the liquid to be poured into the container between the front wall of the container and the endless carrier B.

By so providing the chute 48 with the handle 52, the chute may be manually moved to a possition as shown in dotted lines in Figure 2 for preventing the liquid from being discharged through the chute should such become desirable.

From the foregoing description it will be apparent that a novel and improved measuring conveyer for use in the dispensing of liquids and the like has been provided, embodying novel features of assemblage, and embodying an endless carrier composed of a plurality of hingedly or pivotally connected measuring vessels readily separable one from the other, and which vessels embody means whereby the capacity thereof may be varied for dispensing different quantities of liquid. It will also be observed that a novel type of supporting means has been provided for the endless carrier whereby, upon operation of the device, the measuring vessels of the endless carrier are successively brought into and retained in a discharging position until further operation of the control means.

By observing Figure 2, it will be seen that when the feed pulley C is in a position for retaining one of the measuring vessels in a discharging position, that the foremost gripping edge of the pulley is disposed forwardly and slightly below that gripping edge which supports the rear portion of the discharging vessel. It will also be observed that the distance between the adjacent gripping edges 35 of the pulley C is substantially equal to the distance between the pivotal connections of the measuring vessels.

Changes in detail may be made to the specific form of the invention herein shown and described, without departing from the spirit of the invention or the scope of the following claims.

I claim:

1. A measuring conveyer comprising a supporting frame, a pulley having angularly arranged faces rotatably mounted adjacent the upper end of the frame, an endless carrier trained over said pulley and embodying a plurality of hingedly connected buckets having discharge troughs extending from their forward ends, said buckets when passing over said pulley engaging the angularly arranged faces of the pulley, a chute pivotally mounted forwardly of the pulley, and means for rotating said pulley forwardly step by step for successively bringing the angular faces of the pulley into a position inclined toward said chute and said buckets into a position whereby the contents of the buckets will be discharged into said chute, said troughs of the buckets interfitting with the rear end of said chute for guiding the contents of the buckets into the chute, said chute being rocked upwardly at its forward end by said troughs for allowing passages of the buckets from a discharging position.

2. In a conveyer of the class described, a plurality of measuring buckets each having aligning inclined slots provided adjacent its rear end for slidably receiving axially aligning bearing pins carried by and projecting from the sides of the forward end of the adjacent bucket whereby the buckets are pivotally and detachably joined into an endless carrier.

3. In a conveyer of the class described, an endless carrier comprising a plurality of pivotally connected buckets, said buckets each embodying a cup portion and a discharge trough, said discharge trough being provided with axially aligning pins and said cup portion being provided adjacent its closed end with inclined slots, said pins and inclined slots serving for pivotally and detachably connecting of the buckets into an endless carrier.

4. A measuring cup for endless carriers comprising a cup portion having its side walls projecting past the bottom of the cup and provided with aligning forwardly inclined slots, a discharge trough provided at the open end of the cup portion and provided with side walls arranged inwardly of the side walls of the cup portion, and pinions carried by the side walls of the discharge trough and having reduced bearing portions at their outer ends for pivotally fitting in the inclined slots of the bucket arranged in advance thereof.

5. A measuring bucket for endless carriers comprising a cup portion embodying front and rear walls, side walls, and a bottom wall, one of said side walls being provided with apertures spaced at unequal distances from the bottom wall of the cup portion, removable closure plugs for said apertures, and means provided at opposite ends of the bucket whereby a plurality of the buckets may be detachably connected in endless formation.

6. In a measuring conveyer embodying an endless carrier provided with a plurality of pivotally connected buckets having an open forward end, and a freely rotatable feed pulley about which the carrier moves; means for successively moving said buckets into and retaining the same in a discharging position comprising a ratchet disc carried by one end of the pulley and provided at its outer face with equi-distantly spaced apart cam like projections, said disc also being provided in its peripheral edge with notches arranged equi-distantly apart as that of said projections, a yieldable grip arm mounted concentric with the disc at the outer face thereof and engageable with said projections for rotating the disc in one direction for limited advancing of the endless carrier, means for imparting movement to said arm, spring means connected with said arm for returning the same to a normal position behind one of said projections, and a spring finger engageable in the peripheral notches of the disc for preventing counter rotation thereof.

FRED M. GUNN.
WILLIS F. GUNN.